United States Patent

[11] 3,541,967

| | | |
|---|---|---|
| [72] | Inventor | Frank G. Birkhead<br>Whittier, California |
| [21] | Appl. No. | 759,846 |
| [22] | Filed | Sept. 16, 1968 |
| [45] | Patented | Nov. 24, 1970 |
| [73] | Assignee | Hewitt-Robins, Incorporated<br>Stamford, Connecticut |

[54] AUTOMATIC RELEASING DRIVE CARRIAGE FOR POWER AND FREE CONVEYOR SYSTEM
10 Claims, 8 Drawing Figs.

[52] U.S. Cl.................................................. 104/172, 104/91
[51] Int. Cl.................................................. B65g 17/42
[50] Field of Search......................................... 104/172, 89, 91

[56] References Cited
UNITED STATES PATENTS
3,091,191  5/1963  Fur.............................. 104/172

*Primary Examiner*—Arthur L. La Point
*Assistant Examiner*—Robert Saifer
*Attorneys*—John L. Shortley and John D. Boos ABSTRACT: A drive carriage for a power and free conveyor system is provided wherein the drive dog is prevented from overriding by an indexing mechanism having a spring which is compressed rather than tensioned as in conventional overriding drive carriages. The indexing mechanism includes a pivotally mounted pawl which is held in a first position by a spring means so that the pawl may normally bear against one drive arm on the drive dog and thereby position another of the drive arms in an operative position. The drive dog overrides so as to release any article carrier being driven by the drive carriage by forcing the pawl into a second position and thereby compressing the spring means. A pivoting locking means is also provided on the drive carriage so that the pawl may be readily locked in the first position in order to thereby prevent the drive dog from overriding.

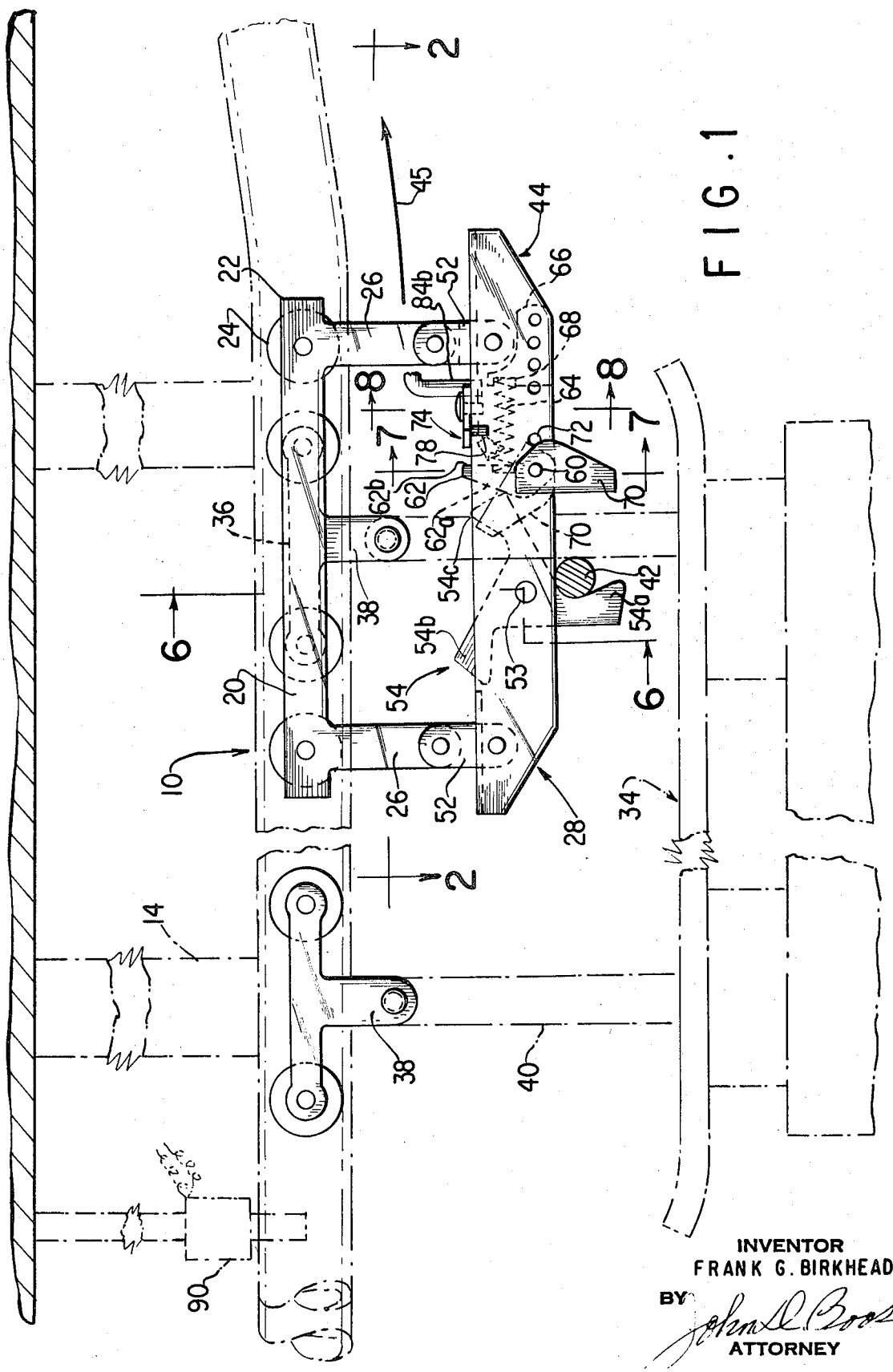
FIG.1
INVENTOR
FRANK G. BIRKHEAD
BY
ATTORNEY

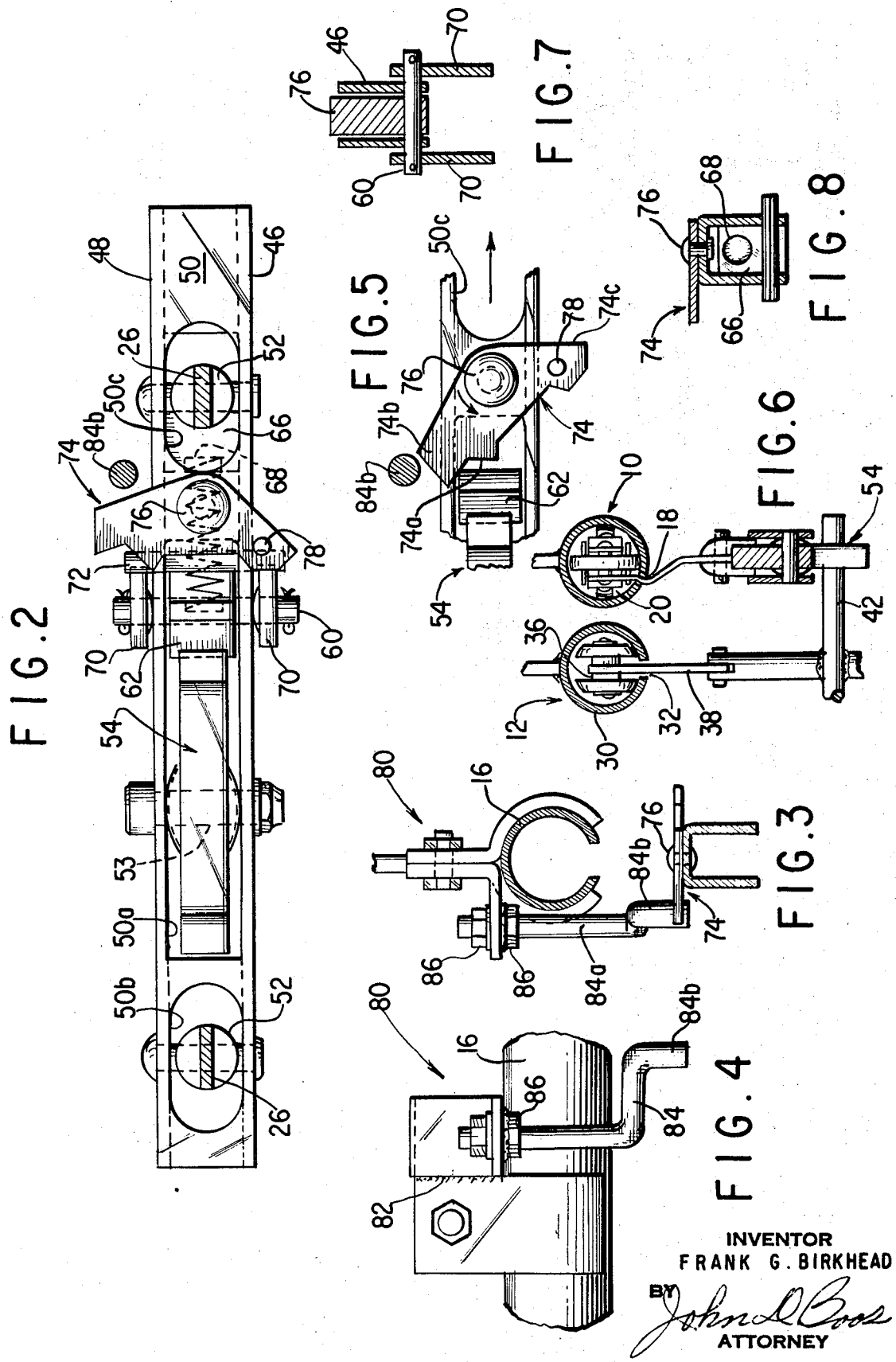

3,541,967

AUTOMATIC RELEASING DRIVE CARRIAGE FOR POWER AND FREE CONVEYOR SYSTEM

BACKGROUND OF THE INVENTION

Power and free conveyor systems are well known in the art. The systems comprise briefly two parallel conveyor tracks: one the power track and the other the free track. Movably supported on the free track for free and independent movement therealong are carriers which are adapted to support the article to be conveyed by the system. The power track is equipped with power-driven conveyor means including, at spaced intervals, drive carriages which are driven along the power track by the conveyor means. The article carriers and drive carriages incorporate cooperating means whereby each carriage can be releasably coupled to an article carrier for moving the latter along the free track. The drive couplings between the drive carriages and the article conveyors are releasable so that the latter can be left at selected stations along the free track while the carriage continues to travel along the power track.

In one existing type of power and free conveyor system of this character, remotely controllable retractable stops are placed at selected positions along the free track. When extended, these stops are located in the path of the movement of the article carriers on the free track. In this system, each drive carriage incorporates a carrier driving means which releases automatically in response to engagement of an article carrier driven by the carriage with an extended stop, so as to thereby free the carrier from the carriage. Successive drive carriages continue to move past the article carrier until a stop is retracted, whereupon the next following carriage will pick up the carrier and again convey the latter along the free track.

In my earlier patent, U.S. Pat. No. 3,079,872, a drive carriage was provided having a pivotally mounted drive dog which was urged to a forward position by a tension spring and which was designed for forming a releasable driving coupling with the article carrier. The tension of the spring was sufficient to restrain the drive dog from swinging rearwardly when the carrier was being pulled along a horizontal section of the track by the drive carriage. However, when the article carrier contacted one of the retractable stops, the drive dog would override by swinging rearwardly in order to uncouple the carrier. After the carrier was uncoupled, the dog would snap back into operative position under the force of the tension spring. In upwardly inclined track section, separate locking rails were attached to the tracks which came in contact with a mechanism on the drive carriage which prevented the drive dog from accidentally swinging rearwardly and thereby releasing the carriage. While the above-described overriding drive carriage has proved satisfactory, it is not without its own peculiar problems. For example, the sharp noise generated by the drive dog springing back into position after releasing the carrier has proved to be quite irritating to people working at the station directly below the drive carriage, and when this is compounded by the multiple use of these drive carriages, the resulting noise becomes quite distracting. Likewise, the installation of the rails necessary to hold the drive dog in an extended position while moving through an upward incline has proven somewhat of a problem. Specifically, the rails are required at the curved transition sections of the tracks where the conveyor changes from a horizontal to an inclined direction and the radius of curvature of the rail section in this transition area is not necessarily, and most times is not, the same as the radius of curvature of the corresponding curved section of the track system. The installation of this type of system may require some trial and error experimentation in order to insure that the drive dog will be held in an extended position through this inclined section. This can become time consuming and adds to the expense of installing the conveyor system. Finally, the tension spring in this type of construction occasionally breaks and requires replacement, and this has become another of the limiting factors in this prior art design.

SUMMARY OF THE INVENTION

The above-described problems are solved by having a multifingered drive dog rotatably mounted in an automatic releasing drive carriage. The drive dog is normally positioned by an indexing mechanism comprising a pivotally mounted pawl which is normally held by a spring means in a first or drive position and which pawl is adapted to be pivoted against the spring means into a second or release position for permitting the drive dog to override. In the drive position the pawl contacts one of the drive fingers on the drive dog and positions another of the drive fingers in an operative position extending beyond one side of the drive carriage. In the release position the drive dog is free to rotate so that the drive finger in the operative position may be rotated into an inoperative position. The pawl is adapted to be positively locked in the drive position by a releasable locking means which enables the drive carriage to be employed in power and free conveyor systems for pulling a carrier up an inclined section of track. Fingertype actuating means are provided which can be coupled to the tracks in such conveyor systems and serve to actuate the releasable locking means into either an opened or closed position.

Accordingly, one object of this invention is to provide an automatic releasing drive carriage for power and free conveyor systems having an improved means for performing the automatic releasing operation.

A more specific object of the invention is to provide an automatic releasing drive carriage having a releasable positive locking means.

A more specific object of the invention is to provide an automatic releasing drive carriage having an improved indexing mechanism for positioning a multifingered drive dog and releasable positive locking means which cooperates with the indexing mechanism.

Still another object is to provide an automatic releasing drive carriage having an improved releasable locking means in combination with a power and free conveyor system having an improved means for actuating the releasable locking means.

DESCRIPTION OF THE DRAWINGS

Other objects, advantages and novel features of the present invention will become apparent in the following more detailed description of the invention when considered in conjunction with the following drawings wherein:

FIG. 1 is a side elevation of the present drive carriage, installed in a power-free conveyor system with parts ommitted;

FIG. 2 is a top view taken along line 2–2 of FIG. 1;

FIG. 3 is a cross-sectional view through the power track, with parts omitted, and specifically showing the actuating means coupled to the track;

FIG. 4 is a side view of the power track and actuating means shown in FIG. 3;

FIG. 5 is a top view, with parts omitted, of a section of the drive carriage illustrating the locking plate in a locked position;

FIG. 6 is a view taken along line 6–6 of FIG. 1;

FIG. 7 is a view taken along line 7–7 of FIG. 1;

FIG. 8 is a view taken along line 8–8 of FIG. 1.

DESCRIPTION OF PREFERRED EMBODIMENT

In the drawing, the numeral 10 denotes the power track and the numeral 12 denotes the free track of a conventional power and free conveyor system. These tracks are suspended in an overhead position by means of hangers 14.

Power track 10 is composed of tubular sections 16 which are rigidly joined coaxial, end-to-end fashion to form a continuous conveyor track. The tubular sections 16 have aligned lower longitudinal slots 18. The slots are disposed in an axial plane of the tubular sections and are inclined at a small angle from the vertical, as shown in FIG. 6.

Within the power track is a power-driven conveyor chain 20 comprising pivotally connected links 22. Centrally mounted on the conveyor chain are supporting rollers 24 that ride on the inner surface of the power track, as shown. Pendants 26 are pivotally attached to the conveyor chain 20 and extend through the track slot 18. Hingably mounted on adjacent pairs of pendants 26 at intervals along the conveyor chain 20 are the present improved automatic releasing drive carriages 28.

The free track 12 also comprises tubular sections 30 which are rigidly joined in coaxial end-to-end fashion. Sections 30 have aligned lower longitudinal slots 32 directly below the center of the track and movably supported on this track, for free and independent movement therealong, are article carriers 34.

Each carrier 34 comprises a pair of wheeled carriages 36 movable supported within the track and pendants 38 extending through the free track slot 32. Hingably supported on the lower ends of these pendants is a frame 40 for supporting articles to be conveyed. A crossbar 42 is rigidly attached to the frame 40 and extends transversely into the path of movement of the drive carriages along the power track.

The conveyor structure thus far described is the conventional system described in U.S. Pat. No. 3,079,872, except for the present improved drive carriage 28 which will hereinafter be described.

Each carriage comprises an elongate rigid frame of body 44. The frame is composed of an inverted channel-shaped member having sides 46, 48 and a central web section 50. As seen in FIG. 2, three longitudinal slots are formed in the central web section 50; a large central slot 50a and smaller slots 50b, 50c located on opposite sides of this center slot. Hingably mounted between the sides 46, 48 of the frame are links 52 which project upwardly through openings 50b, 50c and are pivotally attached to the adjacent pair of pendants 26. If desired, these links may embody swivel joints, not shown, having swivel axes normal to the pivot axis of the links in order to minimize bending of the parts. During operation of the conveyor system, frame 44 moves in the endwise direction indicated by the arrow 45 in FIG. 1. Rotatably supported by pin 53 on the carriage frame 44, so as to rotate on a transverse axis of the frame, is a multifingered carrier drive dog 54. This drive dog is mounted between sides 46, 48 and is adapted to rotate upwardly through center slot 50a. The particular drive dog illustrated has three drive arms 54a, 54b, 54c equiangularly spaced around the hub of the drive dog. Each of these arms are designed to extend beyond the lowest sides of frame 44 so that they may be moved into an operative position, as illustrated by arm 54a in FIG. 1, where they may be in the path of crossbar 42.

Pivotally supported on the carriage frame 44 by means of a pin 60 so as to swing on a transverse axis of the frame, is a pawl 62. The pawl is formed with a convex rear face 62a and a flat front face 62b. The flat front surface of the pawl extends upwardly through the front of opening 50a in the top of the frame and cooperates with the locking means which will hereinafter be described. The convex pawl surface extends rearwardly and is adapted to come into contact with the rear of the arms on the drive dog, as shown in FIG. 1. A spring 64 mounted in spring seat 66 is coupled to, and bears against, the front of the pawl. The spring seat is a block which is rigidly coupled between the sides of the frame and is formed with a blind bore 68 which receives the front end of spring 64. The spring extends substantially parallel to the longitudinal axis of the frame and the rear end of the spring is coupled to the front face of pawl 62. It will be apparent that this arrangement tends to maintain the pawl in a first or drive position, as shown by solid line position in FIG. 1, so that the drive dog is prevented from rotating in a clockwise direction. If, however, the clockwise rotative force on the drive dog is sufficiently high, then the pawl will be pivoted forwardly and compress spring 64 until the pawl is in the second or release position. In this latter position the arm 54c is free to be swung down into the operative position, while the arm 54a is swung up into an inoperative position so as to thereby release the cross bar 42 shown in FIG. 1. It will be recognized that the combination of the pivotally mounted pawl and the spring means form an indexing mechanism for positioning the arms of the drive dog.

The pin 60 extends outwardly beyond each side of the frame and a holdback member 70 is pivotally mounted on each extension. The lower end of the holdback members extend below the lower end of the frame and each are mounted so as to swing in the fore-and-aft direction of the frame. A pin 72 also extends through the sides of the frame and has extensions extending outwardly on either side thereof which serve as a stop means that limits the forward swing of the holdback members to the solid line position shown in FIG. 1. The holdback members are also free to swing rearwardly to the dashed line position in FIG. 1.

A locking plate 74 is pivotally mounted on a pin 76 projecting upwardly from the top of the carriage so that the plate may be pivoted in a substantially horizontal plane about an axis transverse to the frame. The pin 76 is mounted on, and projects upwardly from, the central web section located between opening 50a and 50c. The plate is formed with a notch 74a which serves to prevent the pawl from moving rearwardly when the plate is in the locked position and thereby prevents the release of a carrier being hauled by the drive carriage. In order to move the locking plate into and out of locked position the plate is formed with a first finger or projection 74b that projects beyond one side of the carriage frame for moving the plate into a locked position and a second projection 74c which projects beyond the other side of the frame for moving the plate into an unlocked position. Each of these projections are formed with a front surface that is inclined in an aft direction as it extends beyond the sides of the carriage frame. Coupled to, and projecting downwardly from, the second actuating finger is a stop pin 78 which is adapted to abut against the side of the carriage frame so as to thereby position the locking plate in the unlocked position shown in FIG. 2. The plate may then only be pivoted counterclockwise to the locked position shown in FIG. 5.

The above described projections on the locking plate cooperate with actuating means 80 coupled to the power track at those locations where the locking plate is to be moved either into or out of locked position. The actuating means essentially comprise a clamp 82 which can be coupled along substantially any section of the power track and an actuating rod 84 that is adjustably coupled to the clamp. The clamp is formed with two sections that are formed so as to securely grasp the tube of the power track without interfering with, or obstructing, the slot 18 in the bottom of the track. One of the clamp sections is formed with a flat extension having an aperture formed therein which receives the threaded end 84a of rod 84. The rod is held in position by a conventional double nut connection 86 which enables the actuating end of rod 84b to be adjusted vertically by simply repositioning the nuts 86 on end 84a. The actuating or finger end 84b of the rod may be offset from end 84a, as illustrated, so that end 84b of the rod may be horizontally adjusted with respect to the path of the drive carriages by simply rotating the rod within the clamp mounting.

It will be apparent that this type actuating means may be readily reversed so that the actuating finger is adapted to be positioned in the path of either of the projections 74b or 74c of the locking plate such that the same type of actuating means may be employed to urge the plate 76 into either a locked or unlocked position. The entire system is also designed, and the actuating means is specifically adjusted, so that once an actuating finger has urged the locking plate into the first of two positions, either locked or unlocked, that finger will no longer be in the path of the locking plate and the drive carriage may then pass the actuating means. Thereafter, the locking plate will only be in the path of an actuating finger on the other side of the power track and which finger will serve to urge the locking plate into the second position.

In operation of the conveyor system, assume first that an article carrier 34 is stationary on the free track 12 and a drive carriage 28 is being advanced toward this stationary carrier by the power-driven conveyor chain 20 with the locking plate 74 in an unlocked position. When the drive carriage reaches the carrier, the crossbar 42 is initially engaged by the holdback members 70 on the carriage. These members swing rearwardly, as shown in FIG. 1, to permit the carriage to continue advancing past the carrier to a position where the drive arm 50a, which is shown in an operative position, engages the crossbar 42. The drive dog is prevented from turning by the resistance offered by spring 64 which positions pawl 62 against drive arm 50c. Accordingly, the drive carriage drives the carrier 34 along the free track 12.

In power and free conveyor systems of this type, solenoid-actuated stops or the like are placed in the free track 12 at selected stations along the system at which article carriers 34 may be temporarily left for loading, unloading, or storage. Such sa stop is shown at 90. These stops are located in the path of movement of the article carriers 34 along the free track. When a carrier engages a stop, further movement of the carrier and the carrier crossbar is prevented while movement of the drive carriage continues. As a result, the drive dog is rotated in a clockwise direction, as viewed in FIG. 1, with drive arm 54c pivoting pawl 62 against the action of spring 64 so that arm 54c may rotate past the pawl and thereby permitting the arm 54a to ride over the crossbar 42 into an inoperative position while allowing the next succeeding drive arm 54c to be rotated into the operative position where it is on a level with the crossbars of the carriers. The carrier held by arm 54a is thereby released from the drive carriage which continues to move along the power track 10 with drive arm 54c in the operative position ready to receive the crossbar on the next carrier. Following drive carriages on the power driven chain 20 will, of course, continue to move past the carrier so long as the stop 90 is extended.

When it is desired to again advance the article carrier 34 along the free track 12, the stop 90 is retracted by energizing its solenoid. The next drive carriage 28 reaching the article carrier will then engage the latter in the manner described above and drive it along the free track. In this way, an article carrier may be picked up from or left at any selected station of the conveyor system.

In a typical power and free conveyor system, the conveyor tracks 10 and 12 will not be entirely horizontal. Rather, some parts of the tracks are inclined either upwardly or downwardly. The purpose of the holdback member 70 on the drive carriage 28 is to hold back an article carrier being driven by the drive carriage during movement of the latter along a downwardly inclined section of track.

When the joint movement of the drive carriage and article carrier might accidentally cause the drive dog to index and release the carrier because, for example, the carrier is being moved up a steep incline, then the locking plate 74 can be moved into a locked position so that the pawl 62 cannot be pivoted forwardly. This is accomplished by positioning an actuating means on the power track with the actuating finger located so that the finger may contact projection 74b and urge the locking plate 74 into a locked position. At the top of the incline, another actuating means may be coupled to the power track with the actuating finger located on the opposite side of the track, so that the finger may contact projection 74c and urge the locking plate into an unlocked position.

It will be recognized from the above description that the overriding drive dog mechanism of the instant invention eliminates the recoil shock, and the attendant noise resulting therefrom, which resulted when a tension spring type of overriding drive mechanism was operated in the drive carriage disclosed in U.S. Pat. No. 3,079,872. The use in the present invention of an indexing mechanism having a spring which is compressed, rather than tensioned, greatly increases the life of the drive carriage by decreasing the spring link wear and the drive arm breakage experienced with the prior unit. Likewise, the installation of a conveyor system employing this type of carriage is simpler and faster by virtue of the fact that the actuating means for the locking mechanisms of the instant invention may be rapidly installed and adjusted and thereby eliminating many of the installation problems which were experienced when installing the special locking tracks required with carriage described in U.S. Pat. No. 3,079,872. Obviously, many modifications and variations of the present invention are possible in light of the above teachings. It is therefore to be understood that within the scope of the appended claims, the invention may be practices otherwise than as specifically described herein.

I claim:

1. A drive carriage for a power and free conveyor system of the character described comprising an elongate frame, means on the frame to suspend the latter from a conveyor system for endwise movement of the frame in the system, an improved drive dog mechanism comprising a dog having a plurality of drive arms formed thereon, said dog being rotatably mounted in a fixed location on said frame so that one of said drive arms at a time may be positioned in an operative position extending beyond one side of said frame, indexing means movably mounted on said frame for movement between a first and a second position, said indexing means being resiliently held in said first position, said indexing means being positioned in the path of rotation of said drive arms when said indexing means is in said first position whereby one of said drive arms contacts said indexing means and thereby positions one of the other of said drive arms in said operative position, said dog adapted to be rotated against said indexing means in order to force said indexing means into said second position and thereby allow the drive arm in said operative position to be moved into an inoperative position when another of said drive arms is moved into said operative position.

2. The subject matter of claim 1 which further includes a releasable locking means mounted on the frame which can lock the indexing means in said first position.

3. The subject matter of claim 1 wherein said indexing means comprises a pawl mounted on said frame for pivotal movement between said first and said second positions, said pivotal movement being about an axis approximately parallel to the axis of rotation of said dog, resilient means mounted on said frame and coupled to said pawl so as to position said pawl in said first position.

4. The subject matter of claim 3 wherein said resilient means is a spring positioned so that said pawl compresses said spring while pivoting from said first position to said second position.

5. The subject matter of claim 3 which further includes at least one holdback member pivotally mounted on said frame on the same pivot axis as said pawl.

6. The subject matter of claim 3 which further includes a releasable locking means pivotally mounted on the frame which can be pivoted into a locking position whereby said pawl is prevented from pivoting into said second position.

7. The subject matter of claim 6 wherein said pawl extends beyond the top of said frame, said releasable locking means being mounted on the top of said frame such that when moved into said locking position said pawl extending beyond the top of said frame so as the thereby prevent the pawl from pivoting into said second position.

8. The subject matter of claim 3 wherein said pawl extends beyond the top of said frame and said releasable locking means comprises a locking plate pivotally mounted on the top of said frame on an axis transverse of said frame and being adapted to be pivoted into a position immediately adjacent the section of said pawl extending beyond the top of said frame, said locking plate being formed with projections extending beyond each side of said frame which are adapted to be contacted by actuating fingers for actuating said locking plate.

9. In a power and free conveyor system a combination of two parallel conveyor tracks having an upwardly inclined section, a drive carriage movable along one track, means for driving said carriage along said one track, an article-supporting carriage movable along the other track, said drive carriage including a rigid elongate frame and means supporting each end of said frame on the respective conveyor track, a drive dog having a plurality of drive arms formed thereon, said dog being rotatably mounted on said frame so that one of said drive arms at a time may be rotated into an operative position, indexing means mounted on said frame, said indexing means being movable between a first and a second position and resiliently biased into said first position, said indexing means in said first position adapted to contact one of said drive arms for positioning another of said drive arms in said operative position, said article carriage including a member engageable with the drive arm in said operative position to form a driving connection between said carriages whereby said article carriage is driven along its track by said drive carriage, said indexing means being adapted to release said drive dog and thereby permit disengagement of said article carriage from said drive carriage when said indexing means has been moved into said second position, releasable locking means mounted on said frame which releasably locks said indexing means in said first position, actuating means mounted at both the bottom and the top of said inclined section of said one track for actuating said releasable locking means into a locked and unlocked position, respectively.

10. The combination defined in claim 9 wherein each of said actuating means comprises an actuating finger adjustably mounted on said track, said adjustable mounting permitting said actuating finger to be adjusted both vertically and horizontally.